United States Patent
Natarajan et al.

(10) Patent No.: US 11,533,245 B2
(45) Date of Patent: Dec. 20, 2022

(54) METHOD AND APPARATUS FOR MEASURING END-TO-END PACKET LATENCY AND PACKET DELAY VARIATION VIA DEEP PACKET INSPECTION AT AN INTERMEDIATE NODE OF A COMMUNICATION NETWORK

(71) Applicant: Celona, Inc., Cupertino, CA (US)

(72) Inventors: Preethi Natarajan, Saratoga, CA (US); Mehmet Yavuz, Palo Alto, CA (US)

(73) Assignee: Celona, Inc., Campbell, CA (US)

( * ) Notice: Subject to any disclaimer, the term of this patent is extended or adjusted under 35 U.S.C. 154(b) by 0 days.

(21) Appl. No.: 17/078,990

(22) Filed: Oct. 23, 2020

(65) Prior Publication Data

US 2021/0250268 A1 Aug. 12, 2021

Related U.S. Application Data

(60) Provisional application No. 62/972,167, filed on Feb. 10, 2020.

(51) Int. Cl.
*H04L 12/26* (2006.01)
*H04W 24/06* (2009.01)
(Continued)

(52) U.S. Cl.
CPC ........ *H04L 43/0864* (2013.01); *H04L 43/106* (2013.01); *H04W 24/10* (2013.01); *H04W 76/10* (2018.02); *H04W 80/06* (2013.01)

(58) Field of Classification Search
None
See application file for complete search history.

(56) References Cited

U.S. PATENT DOCUMENTS 9,787,559 B1 10/2017 Schroeder
2007/0195797 A1* 8/2007 Patel ................... H04L 43/0852
370/469

(Continued)

FOREIGN PATENT DOCUMENTS

EP 3005622 9/2018
WO 2015016919 2/2015

(Continued)

OTHER PUBLICATIONS

Thomas, Shane, International Search Report and Written Opinion received from the URSO dated Sep. 28, 2021 for appln. No. PCT/US2021/17332, 9 pgs.

(Continued)

*Primary Examiner* — Scott M Sciacca
(74) *Attorney, Agent, or Firm* — Jaquez Land Greenhaus & McFarland LLP; Bruce W. Greenhaus, Esq.

(57) ABSTRACT

A method and apparatus for monitoring network performance in near real-time by making measurements on packets received at an intermediate node in a wireless communication network. The solution is useful for any packetized communication network that connects a client and application server, and particularly for any application running over TCP/IP protocol. A method is disclosed for measuring end-to-end qualities of a packet-based communication session between a data sender (DS) and a data receiver (DR) at an intermediate node. The measured end-to-end communication qualities may include latency and packet delay variation.

7 Claims, 18 Drawing Sheets

(51) Int. Cl.
*H04W 76/10* (2018.01)
*H04W 80/06* (2009.01)
*H04L 43/0864* (2022.01)
*H04L 43/106* (2022.01)
*H04W 24/10* (2009.01)

(56) References Cited

U.S. PATENT DOCUMENTS

| | | |
|---|---|---|
| 2014/0307562 A1 | 10/2014 | Bruckman |
| 2015/0180767 A1* | 6/2015 | Tam ................ H04L 45/123 370/389 |
| 2015/0333999 A1 | 11/2015 | Mordani et al. |
| 2017/0366467 A1 | 12/2017 | Martin et al. |
| 2021/0250266 A1 | 8/2021 | Natarajan et al. |

FOREIGN PATENT DOCUMENTS

| | | |
|---|---|---|
| WO | 2018068810 | 4/2018 |
| WO | 2021163101 | 8/2021 |

OTHER PUBLICATIONS

Young, Lee, International Search Report and Written Opinion received from the USRO dated Apr. 28, 2021 for appln. No. PCT/US2021/017338, 19 pgs.

\* cited by examiner

METHOD AND APPARATUS FOR MEASURING END-TO-END PACKET LATENCY AND PACKET DELAY VARIATION VIA DEEP PACKET INSPECTION AT AN INTERMEDIATE NODE OF A COMMUNICATION NETWORK

CROSS-REFERENCE TO RELATED APPLICATION

The present application claims priority to U.S. Provisional Application No. 62/972,167 filed, Feb. 10, 2020, entitled "Method and apparatus for Measuring End-to-End Packet Latency, Packet Delay Variation and Packet Loss Rate via DEEP Packet Inspection at an Intermediate Node in a Communication Network", which is herein incorporated by reference in its entirety.

BACKGROUND

Technical Field

The disclosed method and apparatus relate to communication networks and more particularly to methods and apparatus for real time monitoring of communication parameters in packet-based wireless communications networks to maintain quality of service and more efficiently use network resources.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, and 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their enterprise location, and digital solutions more generally, to improve efficiency and reduce costs. Enterprises benefit from optimizing their computing, storage and networking infrastructure, and improving performance of the business applications within their business location, which increases business efficiencies and reduces cost.

FIG. 1 is an illustration of a basic configuration for a communication network, such as a "4G LTE" (fourth generation Long-Term Evolution) or "5G NR" (fifth generation New Radio) network. Through this network configuration, user equipment (UE) 101a and 101b can connect to External Packet Data Networks (PDNs) 103 and access any of a variety of services such as the Internet, Application Servers, Data Services, Voice Services, and others.

The UEs 101a and 101b connect wirelessly over respective communication links 105a and 105b to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

UE

As used herein, the term "UE' refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement.

BS/AP

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111, which has many functions. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

4G and 5G Architectures

4G/LTE and/or 5G wireless communication networks; that is, communication networks that are constructed according to the specifications of Standard Development Organizations (SDOs) such as 3GPP, are well-documented. The basic components of these communication networks are well-known, and need not be discussed in detail, but are discussed briefly below. Much additional information is available in the current SDO specifications, such as 3GPP specifications TS 21.905, TS 22.852, TS 23.002, TS 23.203, TS 23.501, TS 36.300.

FIG. 2 is a block diagram showing one architecture of an LTE (4G) wireless communication system 200. The 4G network has a flat, all-IP architecture with a separation of control plane and user plane traffic. Acronyms are shown in the network blocks.

FIG. 3 is a block diagram of a 4G architecture 300 in which bearers are illustrated by their letter symbols and lines connecting components. FIG. 4 is a block diagram of a 4G architecture 400 in which the bearers are illustrated by name type and by paths between components blocks. In LTE and 5G communication systems, a bearer is an information transmission path that has defined capacity, delay and bit error rate, and possibly other characteristics. Depending upon the configuration of the communication system as implemented, a number of bearers will be defined across different blocks of the system. As will be apparent to one skilled in the art, the bearers available in any particular network architecture may differ.

FIG. 5 is a block diagram of a 5G wireless communication network 300. In this 5G architecture, a Core Network is referenced as 5GC (5G Core). In FIG. 3, acronyms are shown in the network blocks.

CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

Network Performance and Service

Communication networks such as 4G LTE or 5G NR networks deliver connectivity services for different mobile devices and different applications running over the network such as voice, video, real time control and web browsing. Usually these applications have a desired quality of service. For example, in enterprise networks with private 4G LTE or 5G NR systems, different applications require different levels of service in accordance with the needs of the application, and/or service level agreements (SLAs). Typically, these SLAs are translated to maximum bounds on specific Key Performance Indices (KPIs) such as packet error rate, packet delay and packet variation.

Creating end-to-end data paths (e.g. network slices) in 4G LTE and 5G NR networks is one way to provide appropriate Key Performance Indices (KPIs) for different applications. These end-to-end data paths may be designed to provide end-to-end QoS guarantees related to latency, packet delay variation and packet loss. In the 4G standards some end-to-end data paths are bearers, in 5G they may be network slices. For each end-to-end data path, the communication network needs to provide a way to monitor these KPIs to ensure the SLA requirements are met; i.e., to monitor the actual KPI and determine if it is within the desired range of KPIs for that data path.

Ideally these KPIs would be measured at the application server (e.g., which typically resides on the Internet) and client (e.g., which typically resides on the mobile device). However, these type of measurements at the server and client are typically not available and/or not done. It would be useful if these measurements could be made from communication network nodes between the server and client, which are more accessible. It would also be useful if these measurements could be made in near real-time, such as for applications running over the TCP/IP protocol.

SUMMARY

A method and apparatus are disclosed for monitoring network performance, which can be done in near real-time for applications running over the TCP/IP protocol, by making measurements at an intermediate node in the network. Although the following description is focused primarily on 4G LTE and 5G NR networks, the solution is useful for any communication network that connects a client and application server, or for any application running over TCP/IP protocol.

Various embodiments of a system for creating and measuring operational parameters in a packetized communications network are disclosed.

A method is disclosed for measuring end-to-end qualities of a packet-based communication session between a data sender (DS) and a data receiver (DR) at an intermediate node connected between the DS and DR of the communication network. One method comprises the steps of setting up a packet-based communication session between the DS and the DR to define a session packet structure, utilizing the session packet structure to generate session packets in the DS and the DR, and communicating the session packets through the intermediate node to the DR and DS. The packet stream received at the intermediate node includes a plurality of packets that include session packets and other, non-session packets. The session packets are identified from the plurality of packets in the packet stream, and data is selected and stored from the identified session packets. The stored data is processed to measure end-to-end communication qualities of the communication system, including at least one of latency, packet delay variation, and packet loss rate. In some embodiments, the packet-based communication session is a TCP/IP session.

A method is disclosed for measuring latency at an intermediate node of a packet-based wireless communication network during a timestamp-enabled communication session in which a plurality of packets are communicated between a data sender (DS) and a data receiver (DR). The timestamp-enabled session packets include a Timestamp value (TSval) and a Timestamp echo reply (TSecr) value. The latency measurement method includes receiving a first packet sent from the DS having a TSval=S_i, measuring a timestamp of arrival (t1) of the packet at the intermediate node, and sending the first packet to the DR. A reply packet is received at the intermediate node from the DR having a TSecr=S_i, and a timestamp of arrival (t2) of the packet is measured at the intermediate node. Responsive to t1 and t2, a forward RTT value is calculated. The intermediate node receives a first return packet sent from the DR having a TSval=R_i, a timestamp of arrival (t3) of the packet at the intermediate node is measured, and the first return packet is sent to the DS. A return reply packet is received from the DR having a TSecr=R_i, and a timestamp of arrival (t4) of the packet is measured at the intermediate node. Responsive to t3 and t4, a reverse RTT value is calculated. The forward and reverse RTT values are then processed to provide an overall RTT value. In some embodiments, the packet-based communication session is a TCP/IP session, the DS comprises a UE. and the DR comprises a server.

A method is disclosed for measuring packet delay variation (PDV) at an intermediate node of a packet-based wireless communication network during a timestamp-enabled communication session in which a plurality of packets are communicated between a data sender (DS) and a data receiver (DR). The session packets include a Timestamp value (TSval) and a Timestamp echo reply (TSecr) value. The PDV measurement method includes the steps of receiving, at the intermediate node, a first packet sent from the DS having a TSval=S_i, and measuring a timestamp of arrival (t1) of the packet. The intermediate node receives a second packet sent from the DS from the same session and having the same TSval=S_i. The timestamp of arrival (t2) of the second packet is measured at the intermediate node. The inter-packet arrival time between t_1 and t_2 is calculated to provide a forward packet delay (PD) measurement. On the other side, a first return packet sent from the DR is received at the intermediate node having a TSval=R_i, and measuring a timestamp of arrival (t3) of the packet at the intermediate node. A second return packet sent from the DR is received at the intermediate node from the same session and having the same TSval=R_i, and a timestamp of arrival (t4) of the packet at the intermediate node is measured. The inter-packet arrival time is calculated responsive to t_3 and t_4 to provide a return PD measurement. The above process is repeated for a plurality of packets in the session, repeating the steps to provide a plurality of forward PD measurements and a plurality of return PD measurements, and the forward and return PD values are processed to provide an overall PD value. In some embodiments, the packet-based communication session is a TCP/IP session, the DS comprises a UE. and the DR comprises a server. In some embodiments the forward PD value is calculated as t_2−t_1, and the return PD value is calculated as t_4−t_3. The overall PD value measured over a time interval can be calculated as the variance associated with the forward and return PD measurements during that time interval.

DETAILED DESCRIPTION (1) Introduction

Communication networks and system components are described herein using terminology and components common to 4G (LTE) communication systems, and/or 5G NR communication systems, using TCP/IP communication protocols. However, the principles of the communication network monitoring techniques described herein more widely apply to other communication systems, not only to 4G or 5G systems and TCP/IP communication protocols.

An implementation in the context of an enterprise or other private network may be described herein. Although sometimes described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(2) Overview

Methods and apparatus are disclosed herein to measure packet latency, packet delay variation and packet loss rate for end-to-end TCP/IP flows going through a communication network such as a 4G LTE network or a 5G NR network.

Figure 6:
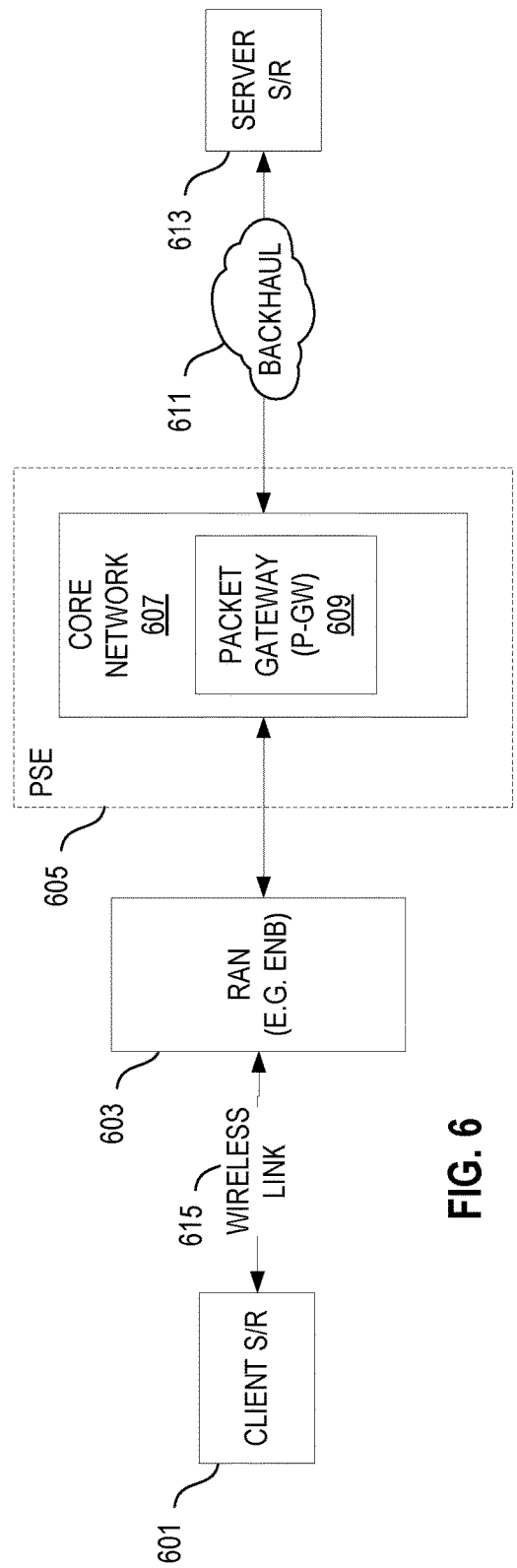
FIG. 6 is block diagram of a communication network including a Programmable Service Edge (PSE) and illustrating a data path through the PSE, between a sender (DS) and receiver (DR) pair.

Reference is made to FIG. 6 which is block diagram of a communication network illustrating a data path between a sender (e.g., server 613) and receiver (e.g., client UE 601) pair. The data path communication goes over a core network 607 (EPC or 5GC) that resides in a Programmable Service Edge (PSE) 605 and a Radio Access Network 603 (that includes an AP, eNB or gNB in the 5G NR case). The PSE 605 includes the core network 607 and other functionalities useful to operate and administer the network, depending upon the needs of the network. Typically, the PSE 605 is connected to a server S/R 613 through a wide area network, or backhaul 611. Also, typically the RAN 603 which may include an eNB, is connected to the Client S/R 601 on the other side via a wireless link 615. In the specific description below, implementations are described as may be implemented in the PSE 605. As mentioned earlier, in general, the communication network does not need to be 4G or 5G, and it can be any IP network connecting the S/R pair (i.e. Client S/R 601 and Server S/R 613).

Figure 7:
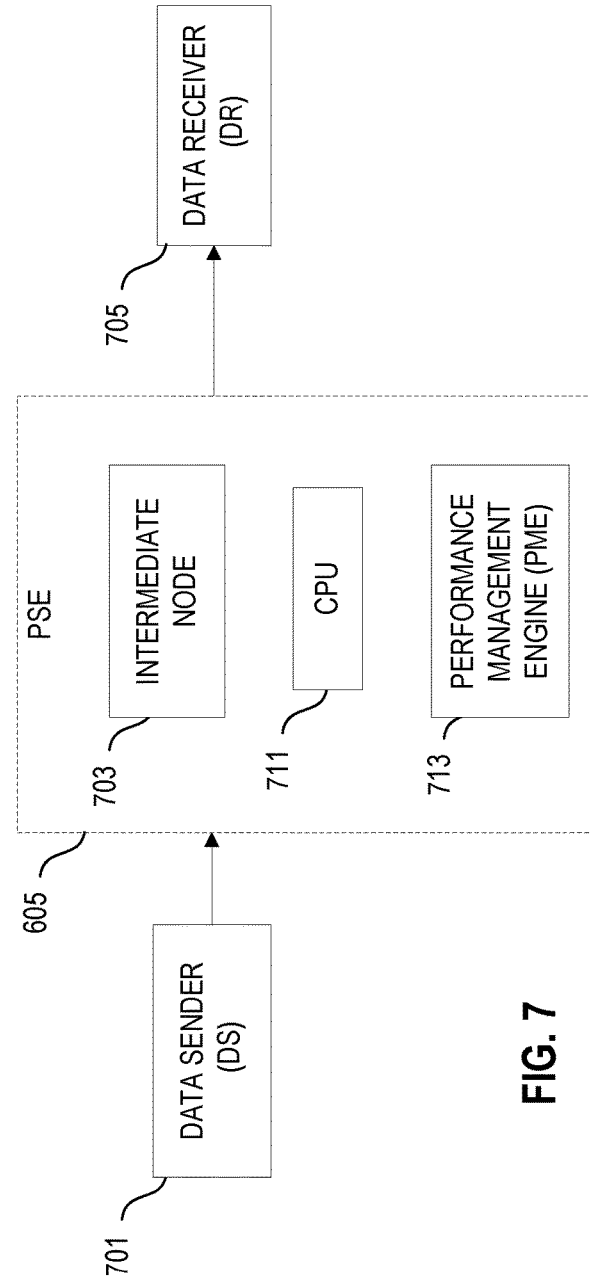
FIG. 7 is block diagram of a communication network including a Programmable Service Edge (PSE), illustrating an intermediate node in the PSE.

For purpose of description, the network in FIG. 6 is simplified in FIG. 7 to show an intermediate node 703 in the PSE 605 positioned between a Data Sender (DS) 701 (e.g. a UE) and a Data Receiver (DR) 705 (e.g. a server). It should be clear that the packets may travel through many other components and paths, and that during the normal course of communications, in one example the UE and server may alternate roles as the DS and the DR.

The intermediate node 703 is located between the DS 701 and the DR 705, receiving and making observations of the packets. The intermediate node 703 receives a plurality of packets, some of which may be part of one session, and other packets may be part of another session. Based upon identifiers in the packets, the intermediate node can identify each packet as being part of one session or another, and therefore select packets associated with only one session as appropriate Typically, the intermediate node 703 will be the Packet Gateway (P-GW) 609 in the PSE 605; however more generally any intermediate node between the S/R pair can be utilized. A P-GW (Packet Data Network Gateway) (PDN Gateway) provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception, and packet screening. Another key role of the PGW is to act as the anchor for mobility between 3GPP and non-3GPP technologies such as WiMAX and 3GPP2 (CDMA 1X and EVDO).

As described herein, the intermediate node 703 in the PSE 605 (which may be termed the "PSE node") makes measurements on the TCP/IP packets moving between the S/R pair. In alternative embodiments, the packet capture measurements and (part of) the analytics could be done on a separate node co-located with the P-GW 609 such as a Performance Measurement Engine (PME) 711. For this implementation, the packets arriving at P-GW could be copied and transferred to the other node via a highly efficient mechanism such as DPDK (Data Plane Development Kit, see www.dpdk.org). More generally, the data from the intermediate node 703 may be analyzed by the PSE 605, or dedicated hardware, or general purpose hardware such as a CPU 713 on the PSE 605, or elsewhere. For example, measurement data may be sent to a separate node; for example, measurement data may be sent to the Performance Measurement Engine (PME) 711 (which may be situated in the PSE 605 or possibly on the cloud) for analytics. This is where the algorithm could also be run for computing Key Performance Indices (KPIs).

(3) Latency and Packet Delay Variation Using TCP Timestamp Option

To measure latency, one embodiment utilizes the TCP Timestamp option, which is defined in RFC 7323 [TCP Extensions for High Performance, RFC 7323, IETF, September 2014, https://tools.ietf.org/html/rfc7323] to make accurate Round Trip Time (RTT) measurements at both sender and receiver. The TCP Timestamp option is enabled by default on Linux [TCP Linux Man Page, http://man7.org/linux/man-pages/man7/tcp.7.html] and Windows servers [Description of Windows 2000 and Windows Server 2003 TCP Features, https://support.microsoft.com/en-us/help/224829/description-of-windows-2000-and-windows-server-2003-tcp-features].

The TCP Timestamp option is negotiated during TCP/IP's SYN (synchronize) handshake. TCP/IP's handshake is a three-way negotiation used to initiate and establish a communication session between a client (e.g. Data Sender 701) and a server (e.g., Data Receiver 705). For example, when a client requests a connection, it sends a SYN segment, which is a special TCP segment, to the server port. The SYN message includes the client's ISN (Initial Sequence Number). The server port responds with a SYN-ACK message, and the client then responds with an ACK message.

Figure 8:
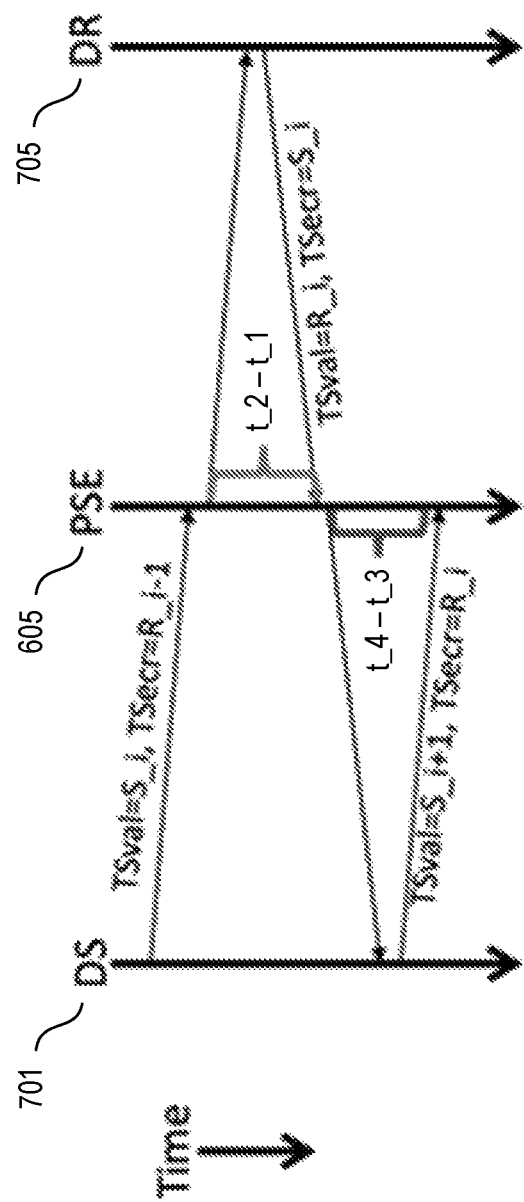
FIG. 8 is a packet flow diagram of communications between a DS and a DR, illustrating latency measurements at an intermediate node in the PSE.

Once negotiated, every TCP packet (in both directions) carries the 8-byte TCP Timestamp option that includes 4 bytes for the TSval (Timestamp value) field, and 4 bytes for the TSecr (Timestamp echo reply) field. The receiver of a TCP packet echoes the sender's TSval in the corresponding TSecr field (FIG. 8). Thus, the TSval value in each direction continues to increase in value over time.

(4) Latency Measurement

Figure 9:
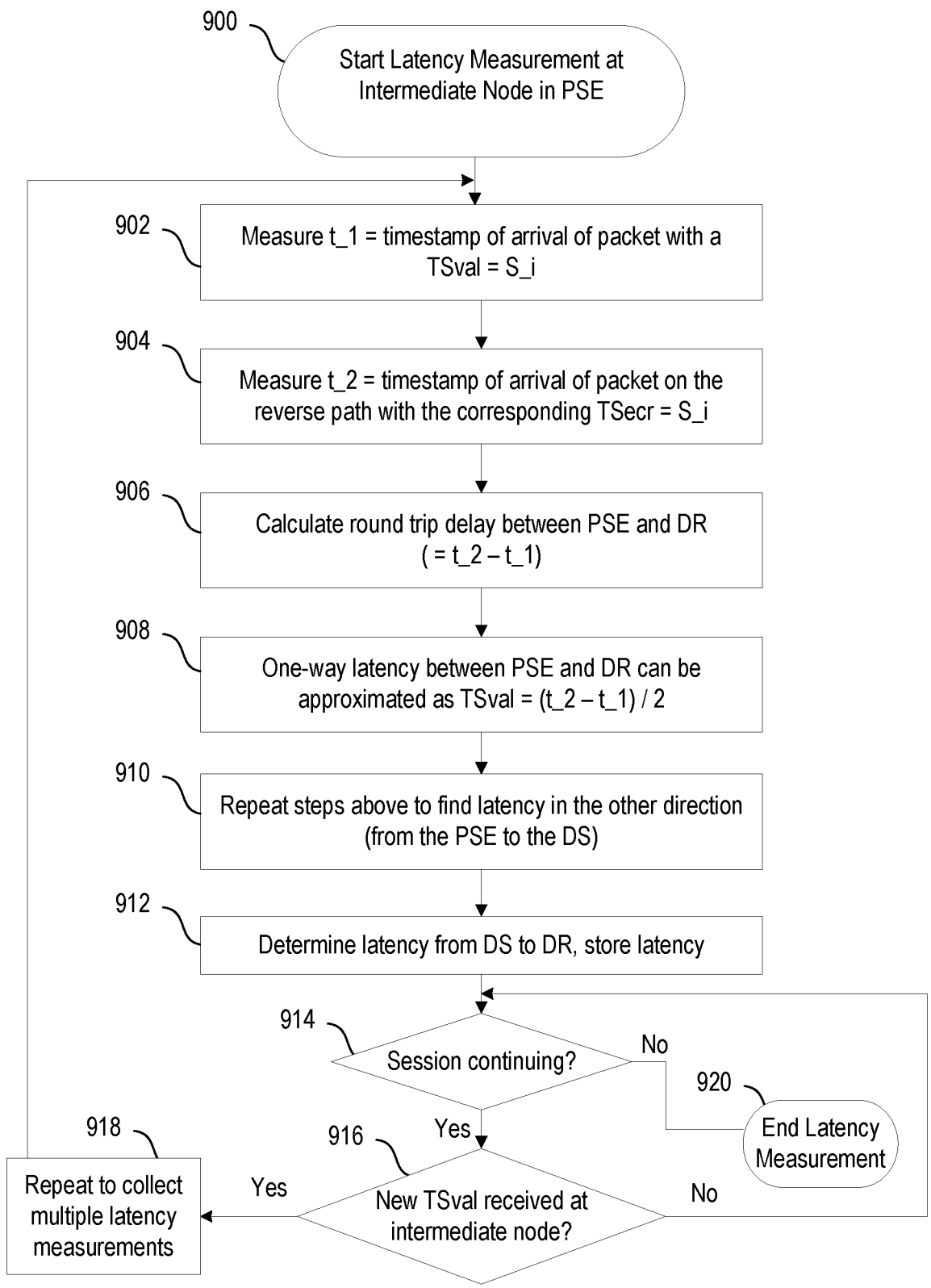
FIG. 9 is a flow chart illustrating operations for performing the latency measurement between the DS and the DR.

FIGS. 8 and 9 illustrate a latency measurement technique described herein. FIG. 8 is a packet flow diagram of communications between a Data Sender 701 and a Data Receiver 705, illustrating latency measurement at an intermediate note 703 (FIG. 7) in the PSE 605. FIG. 9 is a flow chart illustrating the steps for performing the latency measurement between the DS 701 and the DR 705. FIGS. 8 and 9 will be referenced together in the following discussion.

By observing the TSval (Timestamp Value) and TSecr (Timestamp echo reply) values on both directions of the packet flow from the intermediate node 703, the PSE 605 can identify the transmitted and reply packets, and track latency between the PSE 605 to the DR 705, and between the PSE 605 back to the DS 701. From a high-level viewpoint, beginning at the start (STEP 900) the steps to measure latency at the intermediate node of the PSE 605, between the DS 701 and the DR 705, of a packet with an index i, are as follows:

1) Let Track t_1=timestamp, at the intermediate node, of arrival of a packet with a particular TSval=S_i (STEP 902);
2) Let Track t_2=timestamp, at the intermediate node, of arrival of the return packet received on the reverse path from the DR 705, which has corresponding TSecr=S_i (STEP 904);
3) calculate the forward (from the PSE) direction round trip delay between the PSE 605 and DR 705 as TSval=t_2−t_1 (STEP 906);
4) approximate the one-way forward latency between the PSE 605 and DR 705 as TSval=(t_2−t_1)/2 (STEP 908).

The method is next applied looking in the backward (second) direction (STEP 910), to find latency on the opposite side of the intermediate node of the PSE 605. For example on the opposite side of the PSE 605, t_3 is observed to be the intermediate node's timestamp of arrival of the packet with a TSval=R_i, and t_4 is observed to be the intermediate node's timestamp of arrival of the return packet with a TSecr=R_i, then the round trip delay between the PSE 605 and the DS 701 can be calculated as t_4−t_3, and the reverse latency (between the PSE 605 and the DS 701) can be approximated as (t_4−t_3)/2.

The forward latency and reverse latency can then be processed (e.g. added together) to provide the overall round trip latency (RTT) between the DS 701 and the DR 705, and stored at an appropriate location. (STEP 912).

While a communication session is continuing (STEP 914), this method can be repeated every time a new TSval is observed on the flow (STEP 916) so that multiple latency measurements can be collected during the duration of the flow (STEP 918). These multiple latency measurements can be processed (e.g. averaged to provide an average RTT). When the communication session is complete, the process ends (STEP 920).

(5) Packet Delay Variation Measurement

Figure 10:
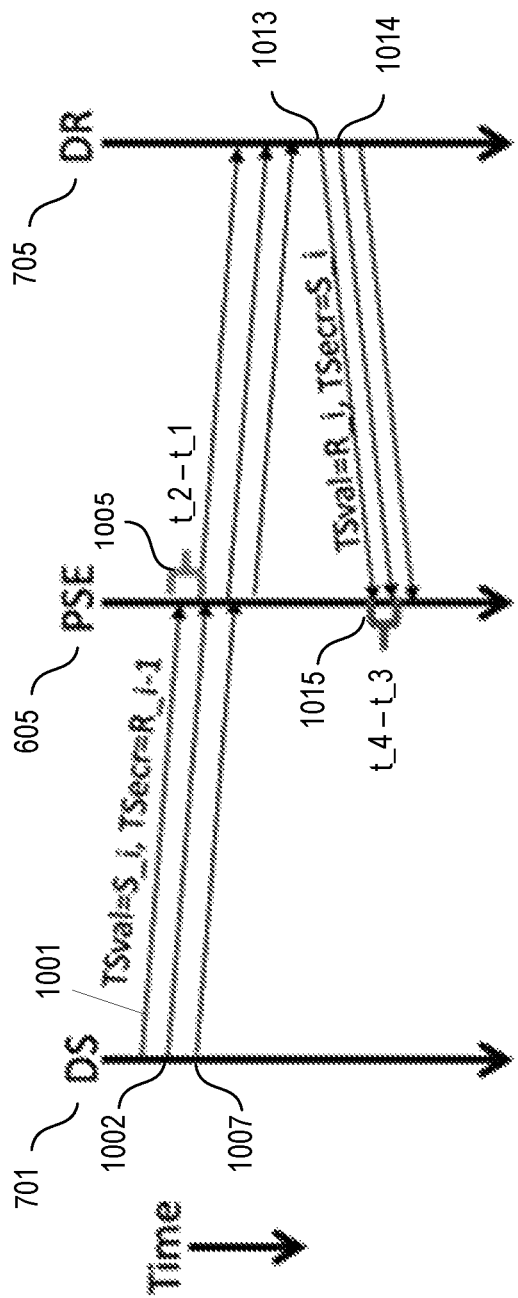
FIG. 10 is a packet flow diagram showing session communications between a DS and a DR, illustrating Packet Delay Variation (PDV) measurement using a TCP Timestamp Option at an intermediate note in the PSE.
Figure 11:
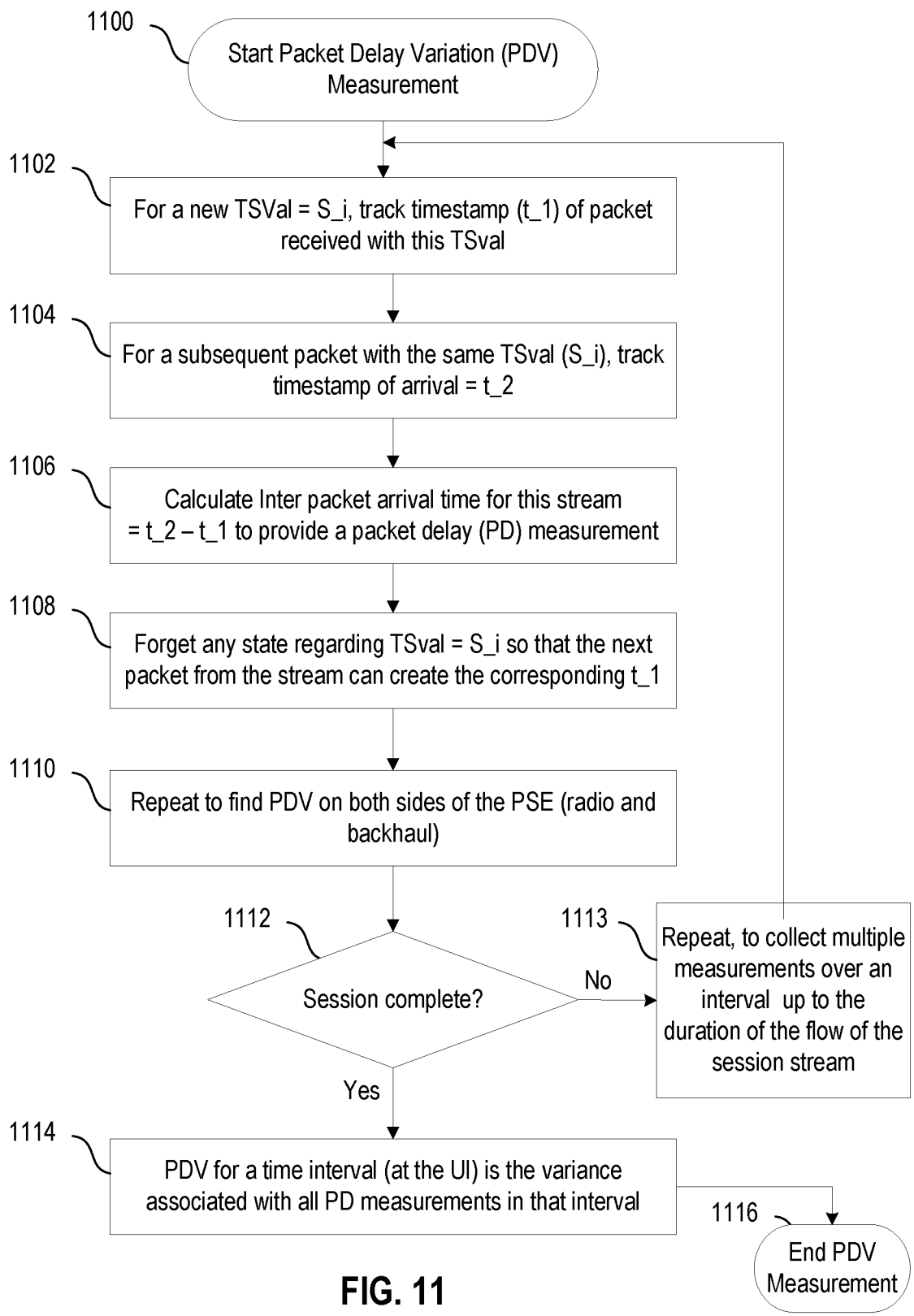
FIG. 11 is a flow chart illustrating the operations for performing the PDV measurement between the DS and the DR.

FIGS. 10 and 11 illustrate the Packet Delay Variation (PDV) measurement technique. FIG. 10 is a packet flow diagram showing session communications between a Data Sender 701 and a Data Receiver 705. FIG. 10 illustrates PDV measurement at an intermediate note 703 (FIG. 7) in the PSE 605. FIG. 11 is a flow chart illustrating the steps for performing the PDV measurement between the DS 701 and the DR 705. FIGS. 10 and 11 will be referenced together in the following discussion.

Packet Delay Variation (PDV) is the variation in packet delay within a stream of session packets; i.e., packets from the same session. See e.g. IP Packet Delay Variation Metric for IP Performance Metrics (IPPM), RFC 3393, IETF, https://tools.ietf.org/html/rfc3393 November 2002. Using a PDV measurement, we can use the observation that multiple packets with the same TSval are most likely transmitted back-to-back from the sender and hence can form the packet stream for calculating the PDV. The packets sent back-to-back (FIG. 10) will most likely arrive back-to-back at the PSE. Variation in the inter-packet arrival time of these packets provides the packet delay variation. Following are steps of this method to measure PDV (STEP 1100) at an intermediate node 703 of the PSE 605:

1) For a new TSval=S_i, track the timestamp (t_1) of a session packet 1001 received (at the intermediate node 703 with this TSval (STEP 1102);
2) For a subsequent session packet 1002 with the same TSval (S_i), track the timestamp of arrival=t_2 (STEP 1104);
3) Calculate inter-packet arrival time 1005 for this stream=t_2−t_1 at the intermediate node (STEP 1106);
4) To make the next PD measurement, disregard any previous state regarding TSval=S_i so that the next packet 10 07 from the stream will create the corresponding t_1 (STEP 1108). This method is repeated every time new TSval is observed on the session flow so multiple measurements can be collected for the duration of the flow.

This method can be applied to find the PDV on both sides of PSE (radio and backhaul). In other words, the same measurement technique can be applied looking in the backward (second) direction (STEP 1110), to make a PD measurement on the opposite side of the intermediate node of the PSE 605. For example on the opposite side of the PSE 605, if t_3 is observed to be the timestamp of the packet 1013 with a TSval=R_i, and t_4 is observed to be the intermediate node's timestamp of the next packet 1014 with a TSecr=R_i, then the PD measurement 1015 with the DS 701 can be calculated as t_4−t_3.

While a communication session is continuing (STEP 1112), this method is repeated (STEP 1113) every time a new TSval is observed on the flow so that multiple PD measurements are collected during the duration of the flow.

The PDV for a time interval (at the UI) is the variance associated with all PD measurements over that interval. When the communication session is complete, or ends for some other reason the PDV can be calculated (STEP 1114), and the process the ends (STEP 1116).

(6) Packet Loss Rate Measurement Using TCP Sequence Numbers

FIGS. 12, 13A, 13B, 13C, 14A-14H collectively illustrate a Packet Loss Rate (PLR) measurement technique.

Figure 12:
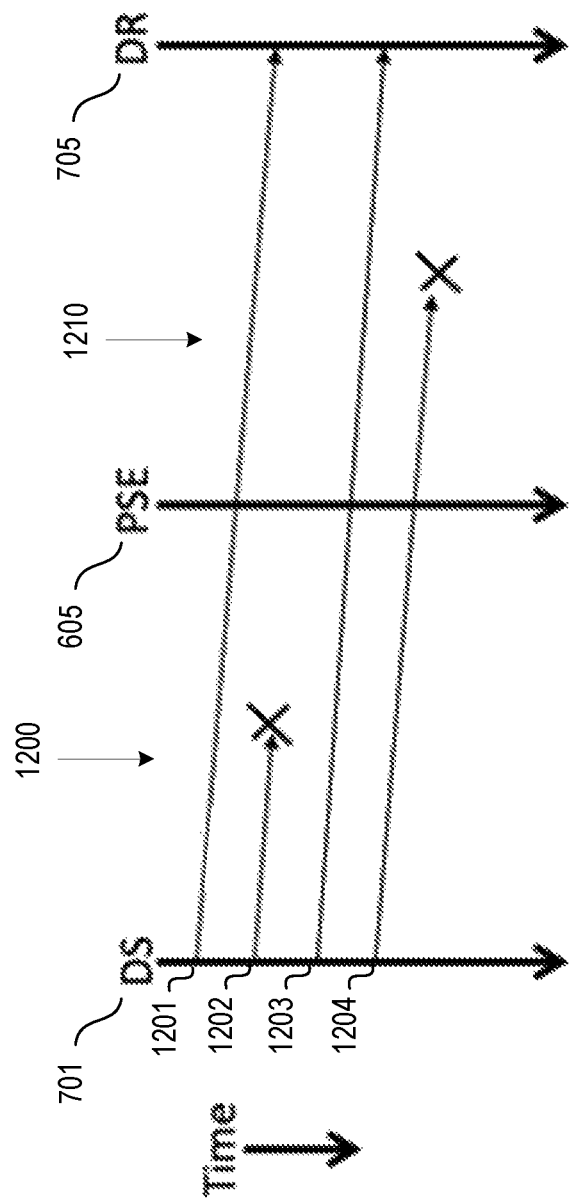
FIG. 12 is a packet flow diagram showing a first series of packets flowing from the DS to the intermediate node in the PSE, and a second series of retransmitted packets flowing from the intermediate node in the PSE to the DR, showing a Packet Loss Rate measurement at intermediate node in the PSE.

FIG. 12 is a packet flow diagram showing a first series of packets 1200 flowing from the DS 701 to the intermediate node 703 (FIG. 7) in the PSE 605, and a second series of retransmitted packets 1210 flowing from the intermediate node in the PSE 605 to the DR 705. As shown in FIG. 12, four packets 1201, 1202, 1203, 1204 in the first packet series 1200 are transmitted in sequence from the DS 701; however in this example the second packet 1202 does not actually arrive at the PSE 605, while the first, third, and fourth packets 1201, 1203, 1204 are received at the PSE 605. More generally, due to a variety of causes, some of the packets transmitted from the DS 701 may not be received at the PSE 605. The received first, third, and fourth packets 1201, 1203, 1204 are re-transmitted by the PSE 605; however, only the first and third packets 1201, 1203 are received by DR 705, and the fourth packet 1204 is lost.

According to TCP/IP protocol, each of the packets 1201, 1202, 1203, 1204 is sent with a TCP sequence number (ts) that identifies its place in the sequence. Generally, this TCP sequence number is monitored at the PSE 605 and the DR 705 to identify which packets have been received, and therefore to determine which packets have been lost; i.e., the Packet Loss Rate (PLR) measurement technique estimates loss counts within a session flow based on TCP sequence numbers observed at the PSE 605. Based upon these loss counts and an RTT measurement, PLR can be determined.

Figure 1:
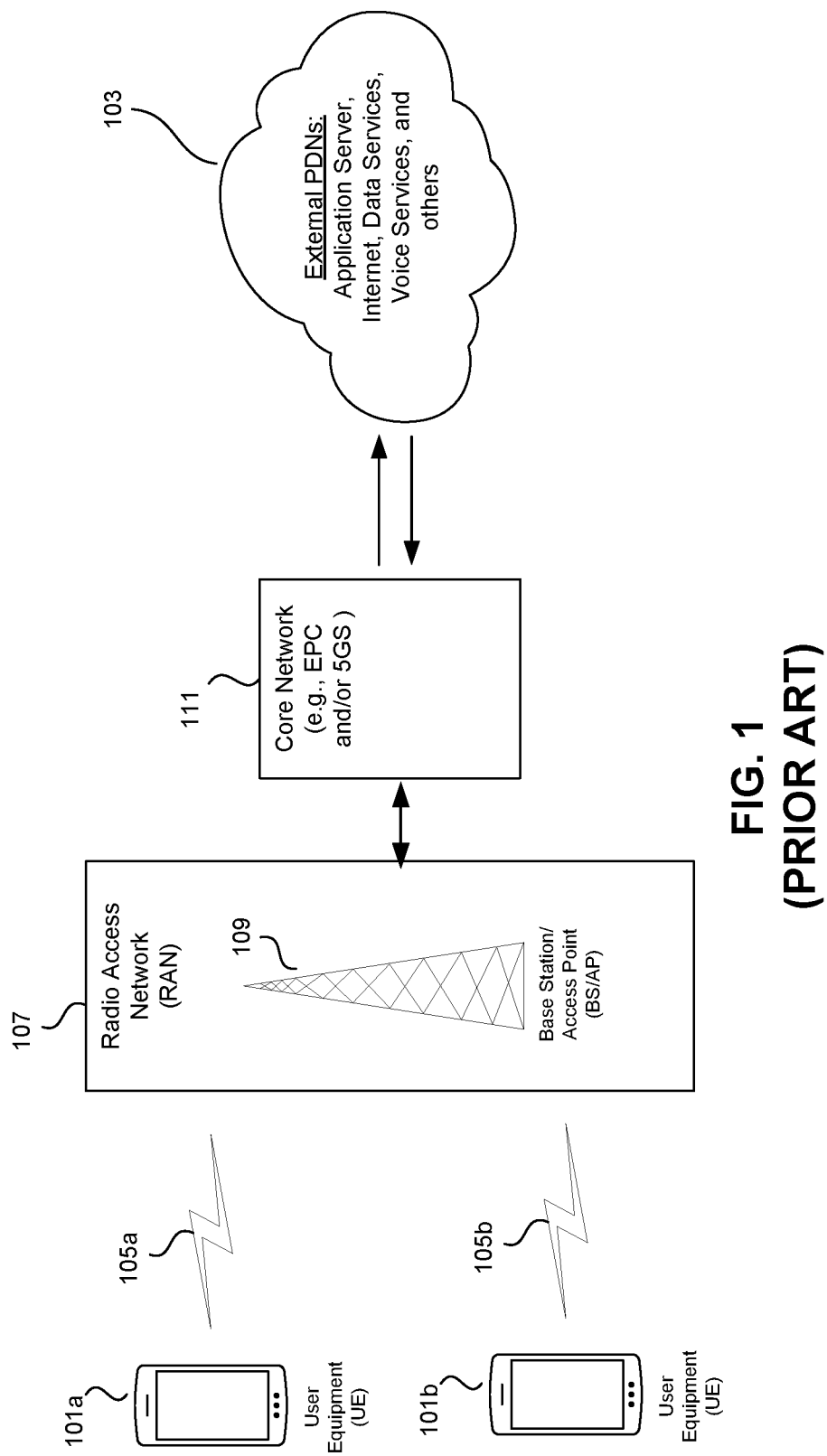
FIG. 1 is a block diagram of a basic configuration for a communication network.
Figure 2:
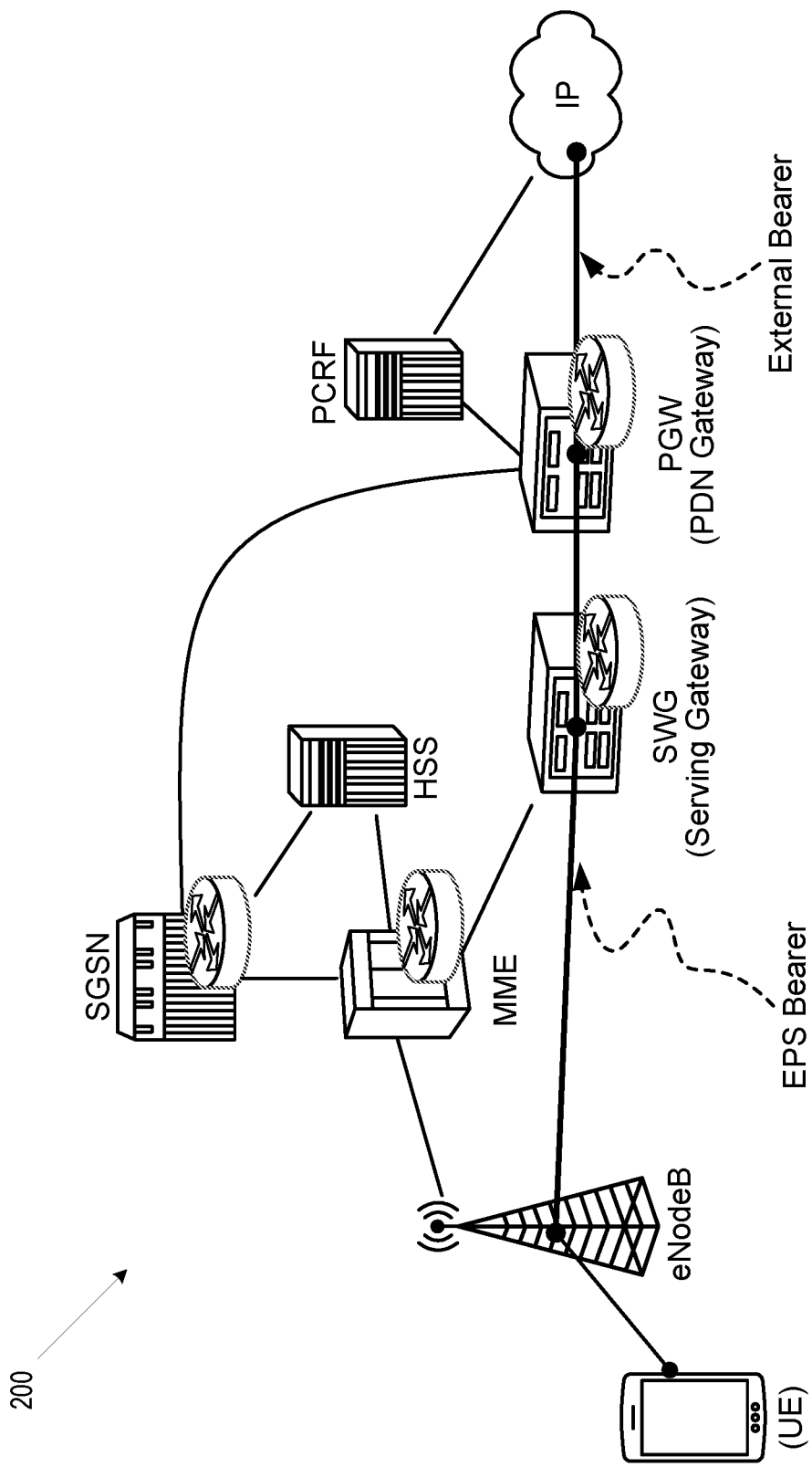
FIG. 2 is a block diagram showing one architecture of an LTE (4G) wireless communication system.
Figure 3:
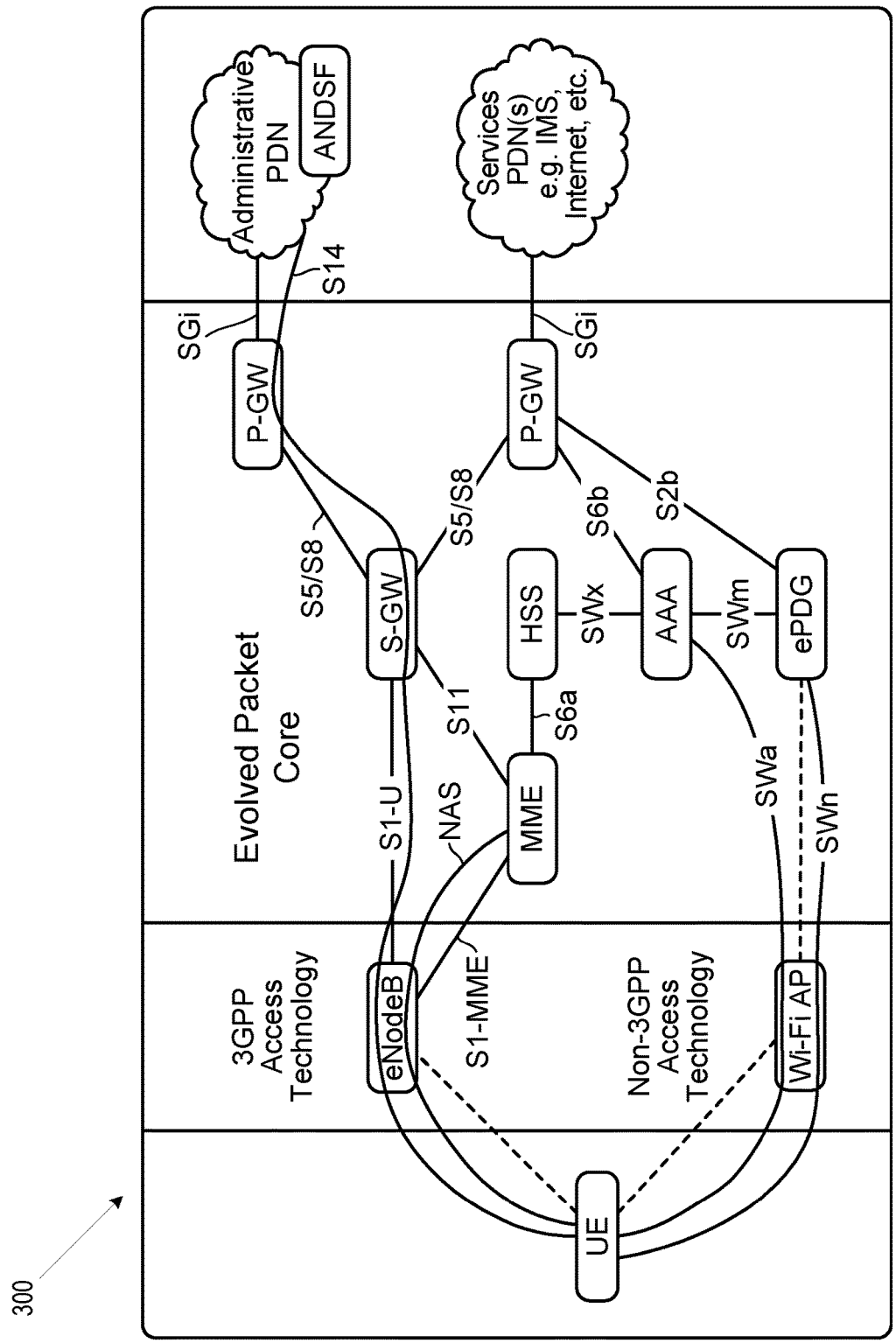
FIG. 3 is a block diagram of a 4G architecture in which bearers are illustrated by their letter symbols and lines connecting components.
Figure 4:
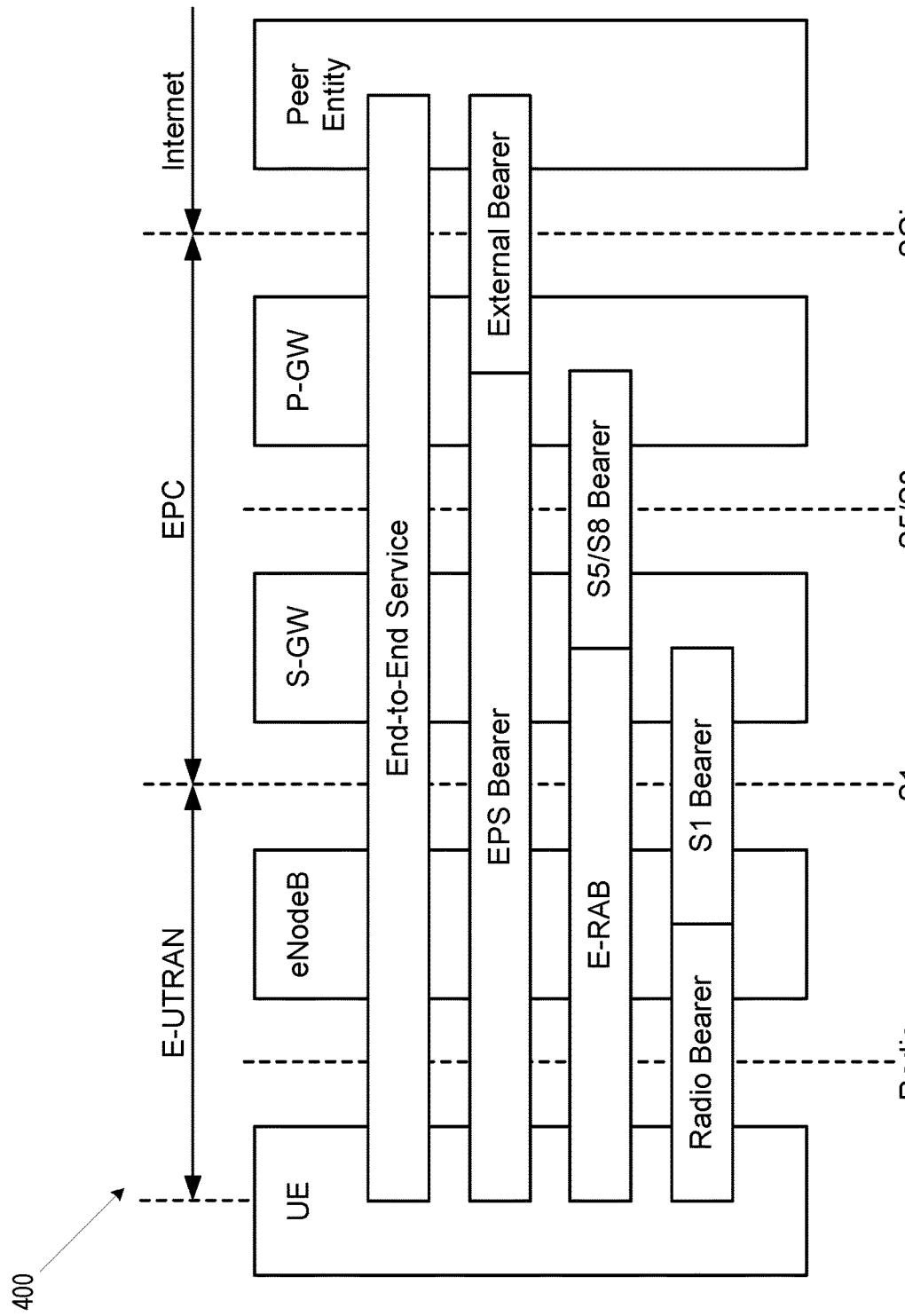
FIG. 4 is a block diagram of a 4G architecture in which the bearers are illustrated by name type and by paths between components blocks.
Figure 5:
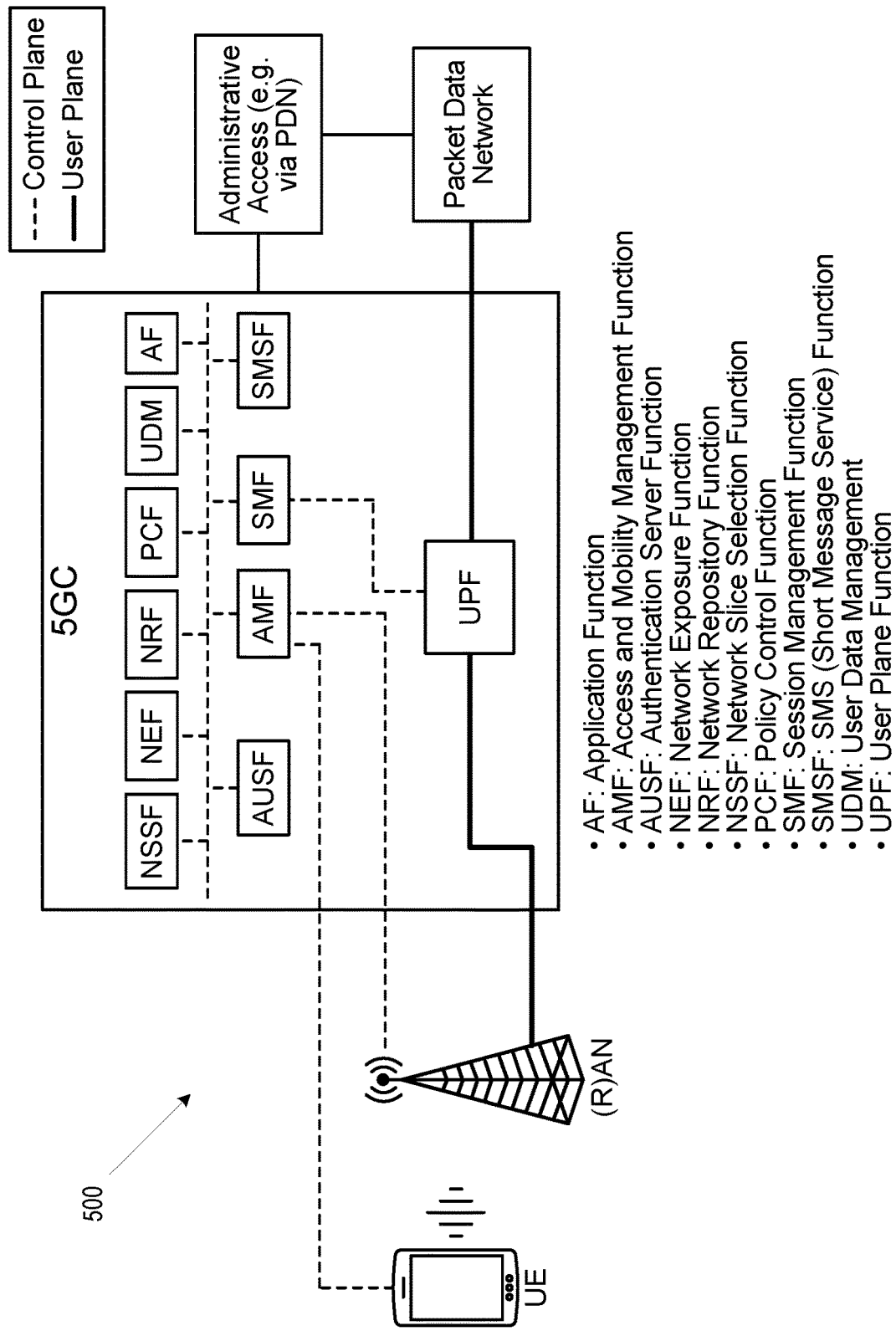
FIG. 5 is a block diagram of a 5G wireless communication network.

As will be discussed, the technique utilizes an estimate for the session flow's RTT (which can be obtained using the technique described with reference to FIGS. 8 and 9) to determine whether an observed out-of-sequence packet is a retransmission or an out-of-order packet. Advantageously, the solution does not require TCP Ack packets to track loss counts and hence requires less resources to operate (is lighter on the implementation footprint) and can be faster. The solution can track both types of loss counts (i.e., loss counts on both sides of the intermediate node)—(i) the loss between the DS 701 and PSE 605 and (ii) the loss between the PSE 605 and the DR 705 (FIG. 12). Depending on where the radio link is situated, an estimate can be made of the loss rate on the radio side; e.g., if a UE 101 (FIG. 1) is the DS 701, then the loss rate on the DS side is the loss rate on the radio side.

Figure 15:
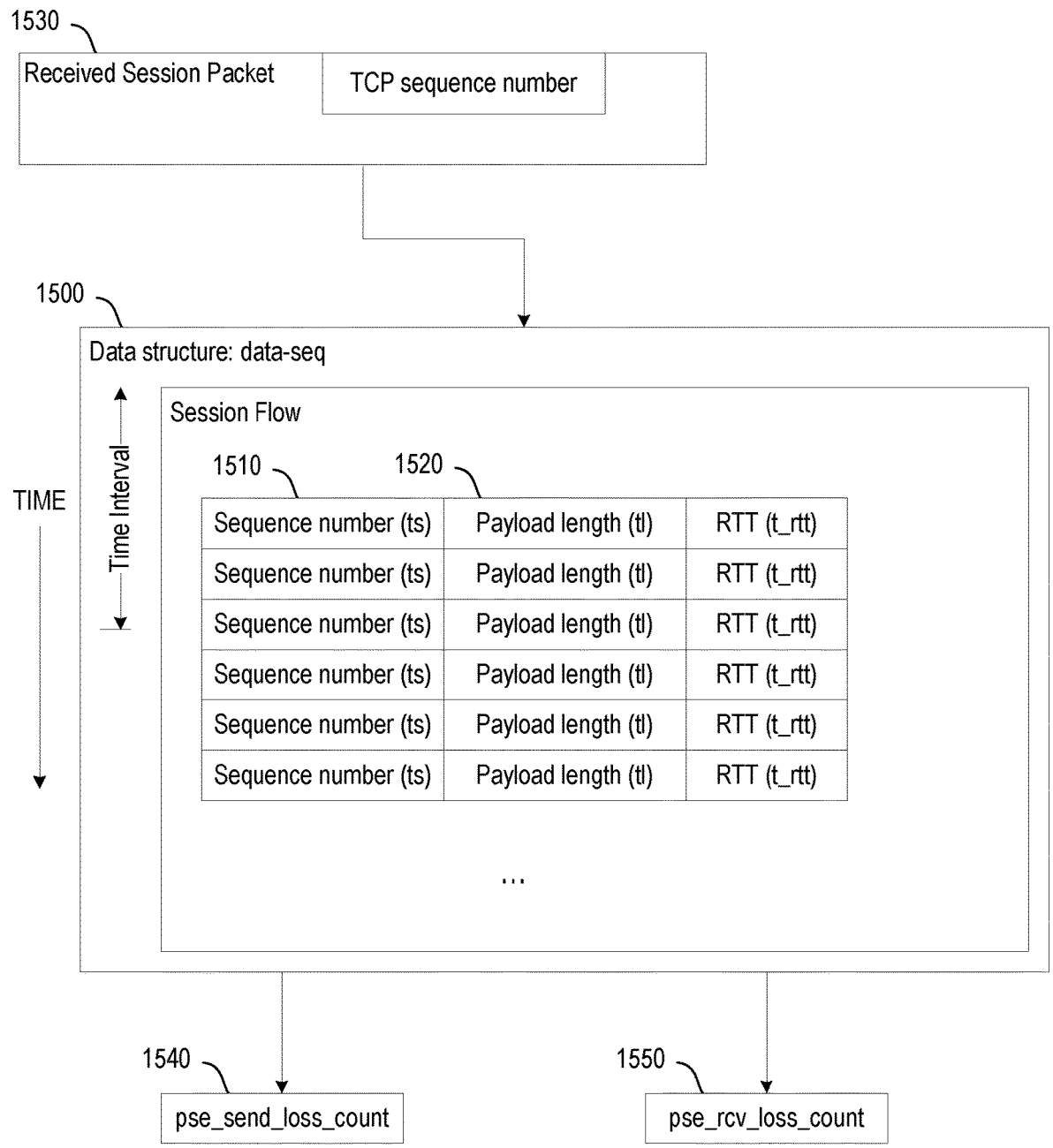
FIG. 15 is a block diagram including a main data structure, termed "data_seq" that tracks the session flow's sequence gaps, as observed at the PSE, and also illustrating a received packet and loss counters.

FIG. 15 is a block diagram illustrating, at a high level, a main data structure 1500, termed "data_seq", which is defined to track the session flow's cumulative sequence number 1510 and sequence gaps, as observed at the PSE 605. The data structure data_seq 1500 is sorted by sequence numbers 1510 (lowest at first). The data structure data_seq also stores the byte length (payload length) 1520 associated with each block. FIG. 15 also shows a received session packet 1530 including a TCP sequence number, and loss counters pse_rcv_loss_count 1540 and pse_send_loss_count 1550.

Figure 13A:
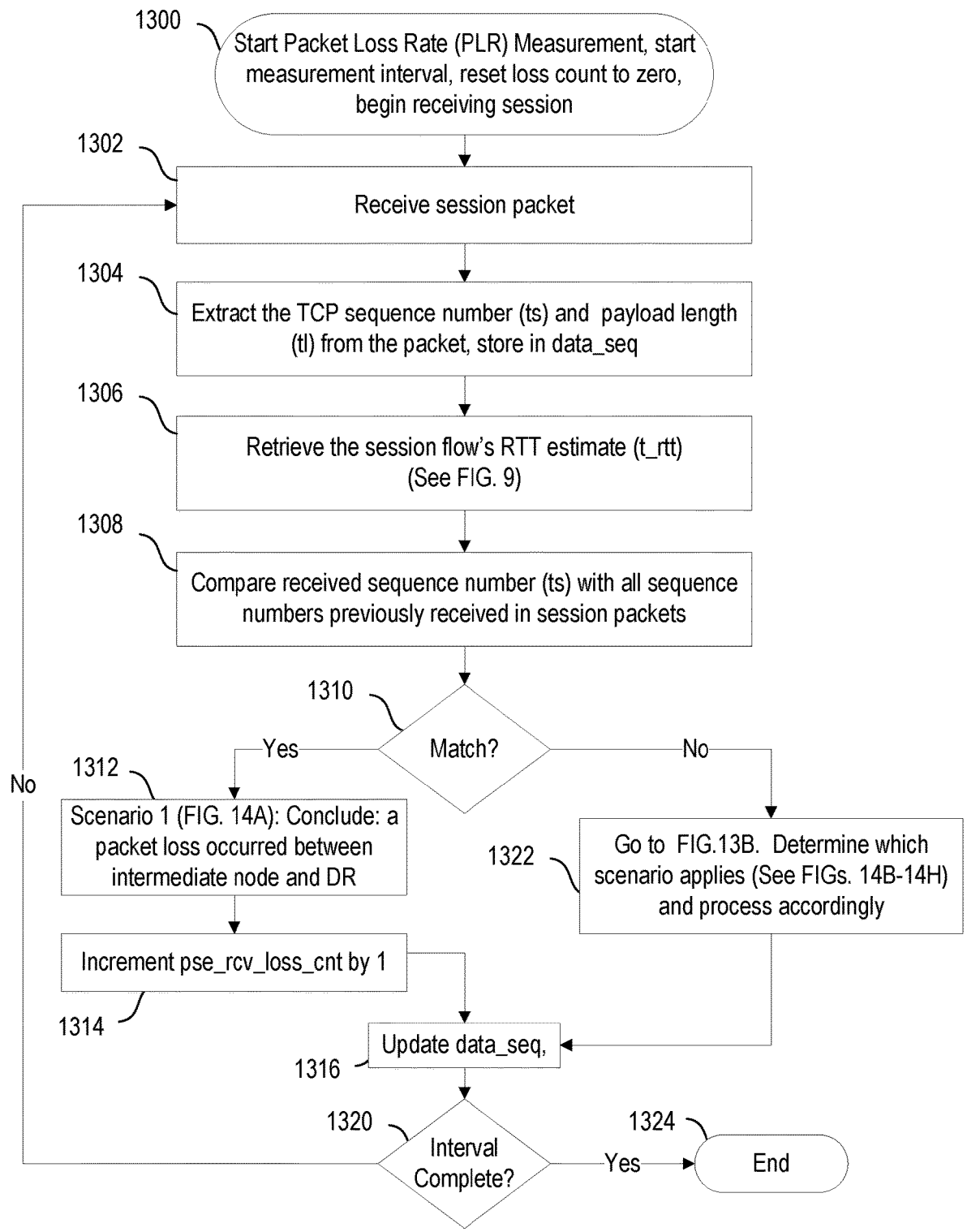
FIG. 13A, FIG. 13B, and FIG. 13C are flow charts that combine to show a flow chart of operations to make PLR measurements, depending upon the scenario existing in the data structure.
Figure 13B:
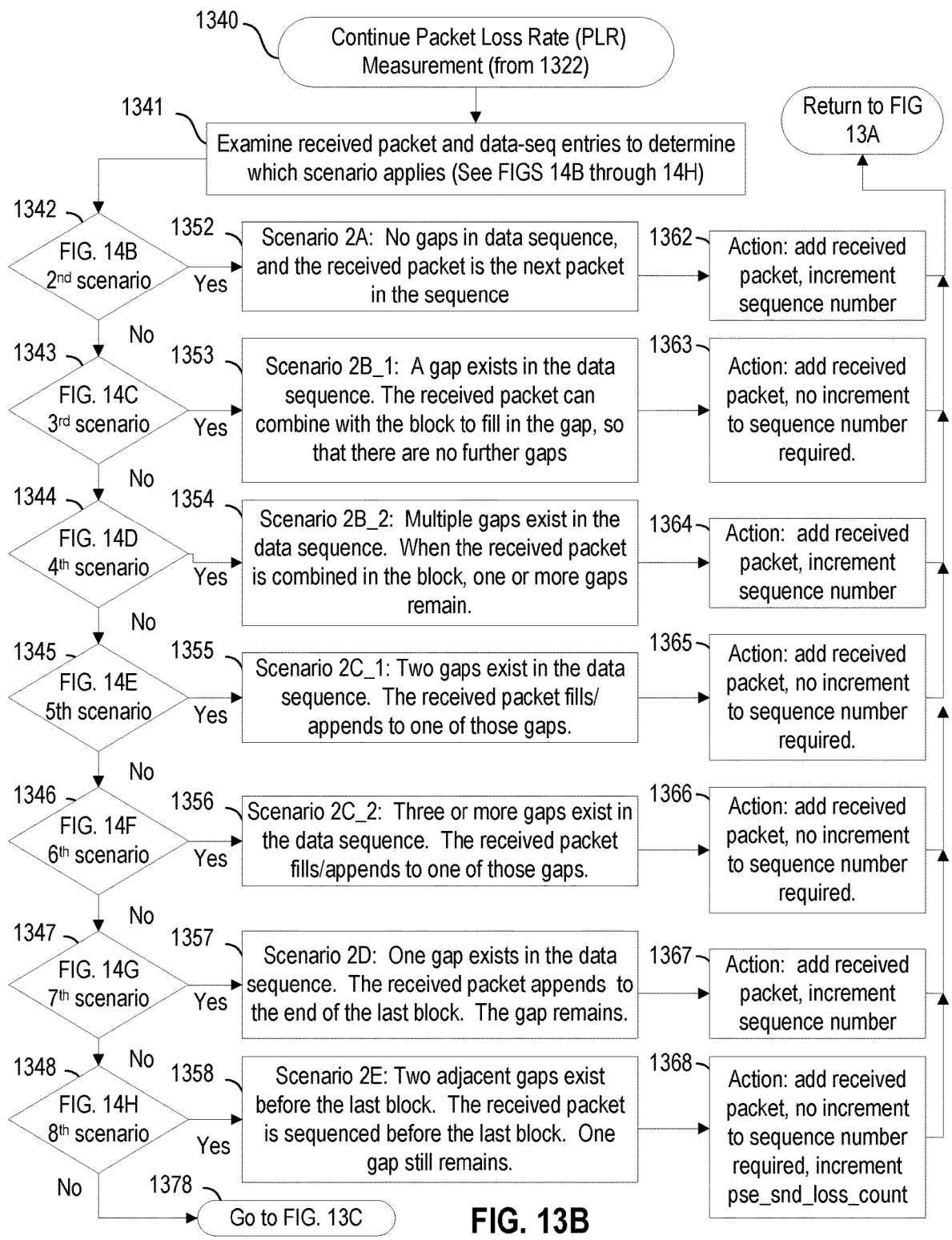
Figure 13C:
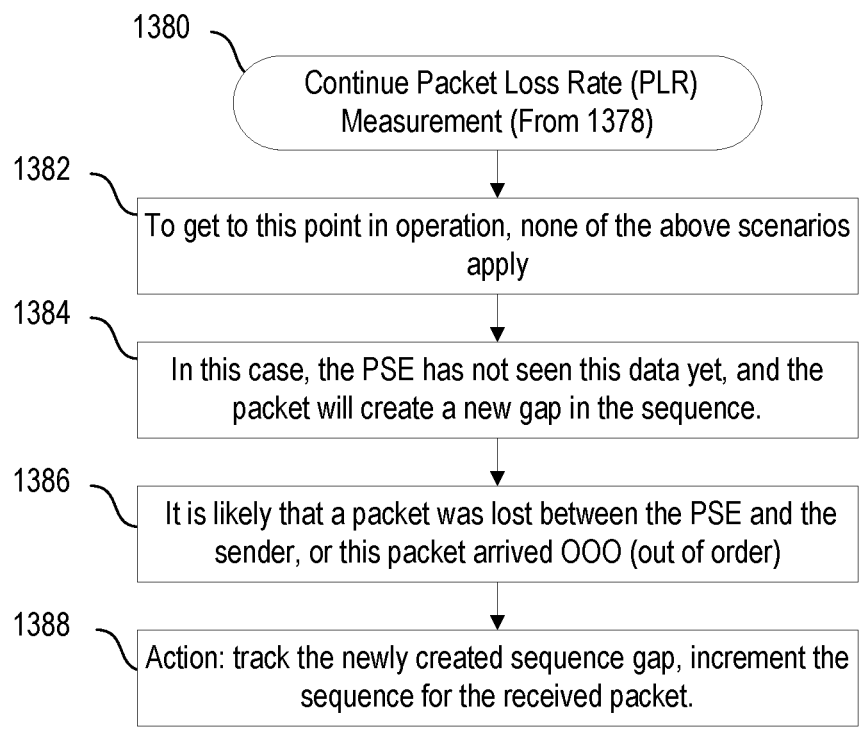

FIGS. 13A, 13B, and 13C are combined flow charts of operations to make PLR measurements.

FIG. 13A is a flow chart of operations to make PLR measurements. To start Packet Loss Rate (PLR) measurement (STEP 1300), the measurement interval is set, loss counters (pse_rcv_loss_count 1540 and pse_send_loss_count 1550) are reset to zero, the session begins, a session packet 1530 is received (STEP 1302), and the following steps are performed for each data packet in the TCP/IP session flow arriving at the PSE 605.

1) The TCP sequence number (ts) and TCP payload length (tl) are extracted (STEP 1304) from the received packet, and are stored in the data structure data_seq 1500.

2) The flow's RTT estimate (t_rtt) is retrieved (STEP 1306). Note that RTT can be estimated during the latency measurements specified elsewhere herein, such as with reference to FIGS. 8 and 9.

3) Next, the received TCP sequence number is compared with all the sequence numbers previously received in the session packets (STEP 1308). If the PSE 605 has already seen the TCP sequence number, (STEP 1310) then there is a match and it can be concluded that a duplicate packet has been received. In that instance it can be concluded that the received packet is a retransmission due to a loss that happened after the intermediate node 703, i.e. the loss happened between the intermediate node and the DR 705. In that case, the receiving end loss counter field (pse_rcv_loss_cnt) is incremented (by 1) (STEP 1314), the data structure data_seq is updated (STEP 1316) and measurement then ends for that packet.

4) If the time interval over which the session packets are examined is not yet complete (STEP 1320), then the process repeats (returns to STEP 1302) for the next packet; otherwise, if the interval is over, the process ends (STEP 1324).

5) Returning to STEP 1310, if there is no match of the received packet with a previous packet (i.e., the packet is not a duplicate), then the received packet and the entries in data_seq 1500 are examined to determine which of various possible scenarios apply (STEP 1322). These scenarios are discussed below with reference to FIG. 13B and FIGS. 14A-14H. The data structure data_seq 1500 is then updated, depending upon which scenario applies (as shown in FIGS. 13B and 13C, discussed below).

6) Also, the packet loss field pse_snd_loss_cnt 1540 will be incremented as applicable; e.g. when a loss is determined to have occurred between the sender DSO 701 and the PSE node 605, such as a gap.

FIGS. 13B and 13C are flow charts of continued operations (1340) to make a PLR measurement at the PSE 605. FIG. 13B begins (STEP 1340) to continue operations from STEP 1322 (FIG. 13A). At the next step (STEP 1341) the received packet and the entries in the data structure 1500 are examined to determine which scenario (FIGS. 14B-14H) applies. Then based upon which of the scenarios apply (STEP 1341), a series of decisions are made. Particularly, FIGS. 14A-14H illustrate the various scenarios, depending upon the state of the data structure data_seq 1500, and the received packet that may be encountered, and these states correspond to decisions in STEPS 1342 through 1348 in FIG. 13B. These scenarios are described below with reference to FIG. 14A, followed by the corresponding steps taken for each scenario, described with reference to FIG. 13A, 13B, or 13C.

Figure 14A:
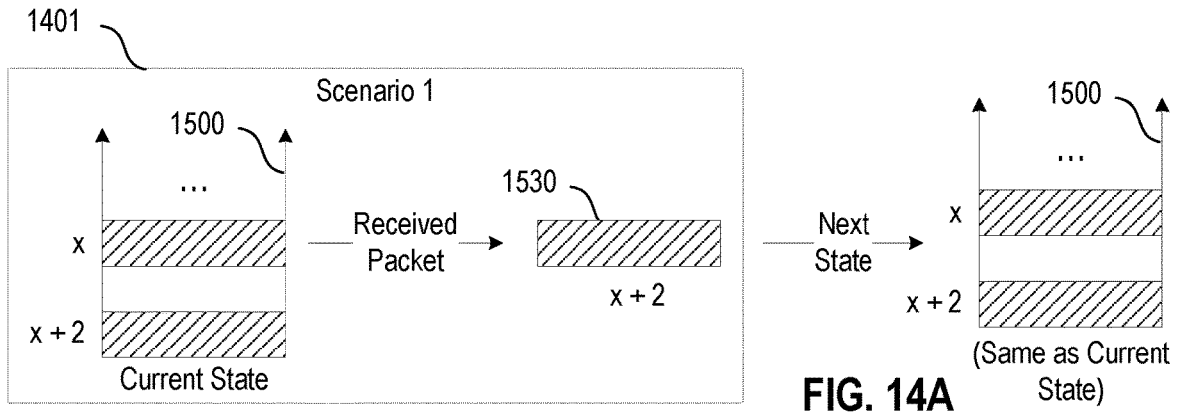
FIG. 14A illustrates a first scenario that may be encountered in the data structure.

FIG. 14A: In the first scenario 1401 (observed scenario 1), the current state of the data structure 1500 shows previously received packets as having TCP sequence numbers x and x+2. The most recently received packet is x+2, which is the same as that previously received, therefore the received packet is a retransmission of a previously-sent packet. Steps taken for this scenario have been discussed with reference to FIG. 13A, particularly steps 1312 and 1314, including incrementing the loss counter pse_rcv_loss_cnt.

Figure 14B:
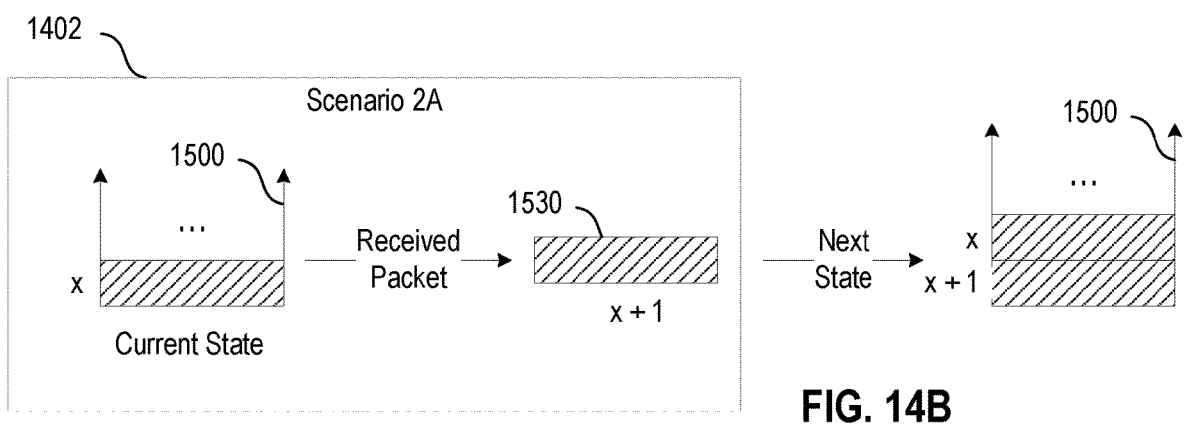
FIG. 14B illustrates a second scenario that may be encountered in the data structure.

FIG. 14B: In the second scenario 1402 (observed scenario 2A), the current state of the data structure 1500 shows the previously received packet as having TCP sequence number x. The most recently received packet is x+1. In FIG. 13B, when this second scenario is met (STEP 1342), there are no gaps in the data sequence, and the received packet 1530 is the next packet in the sequence numbers (STEP 1352). Then (STEP 1362), the received packet is added to the data structure 1500, and the cumulative sequence number (cum_seq) is incremented.

Figure 14C:
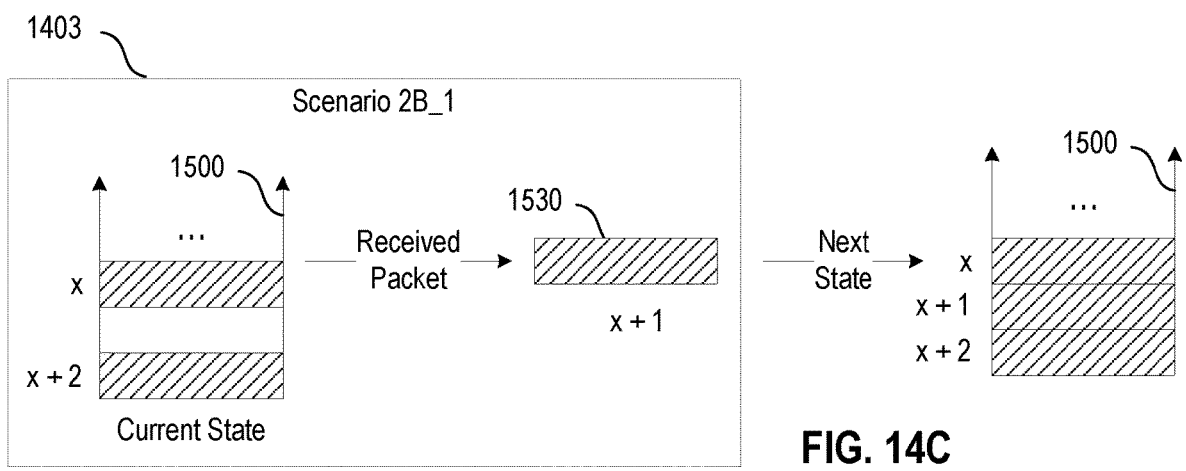
FIG. 14C illustrates a third scenario that may be encountered in the data structure.
Figure 14D:
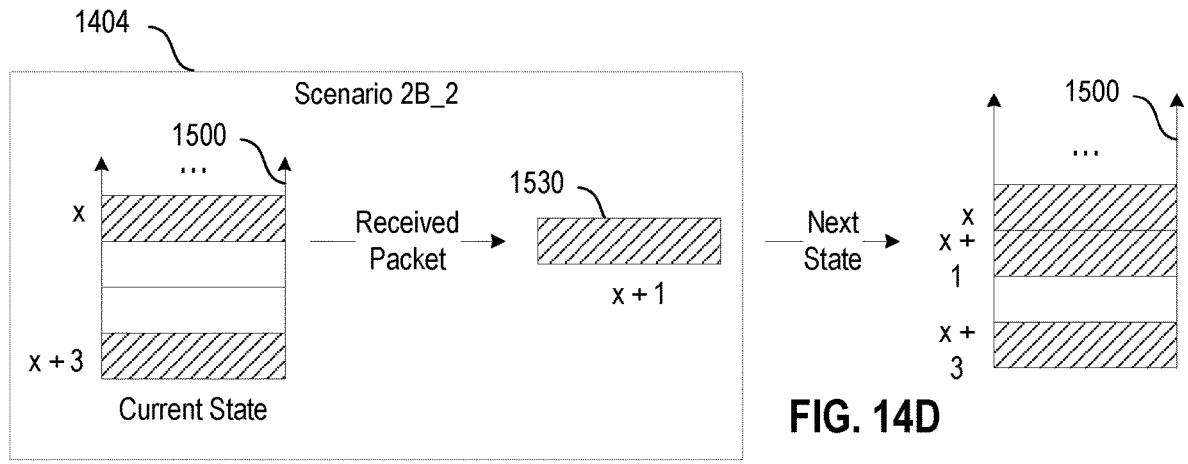
FIG. 14D illustrates a fourth scenario that may be encountered in the data structure.

In FIGS. 14C and 14D (observed scenarios 2B_1 and 2B_2) there are gaps in the data_seq, in which case the received packet 1530 is likely a retransmission, and the packet loss likely happened between the PSE and DS.

FIG. 14C: In the third scenario 1403 (observed scenario 2B_1), the current state of the data structure 1500 shows the previously received packets as having TCP sequence numbers x and x+2. The most recently received packet is x+1. In FIG. 13B, when this third scenario is met (STEP 1343), a gap exists in the data sequence (STEP 1353), and the received packet 1530 can combine with the block to fill in the gap, so that there are no further gaps. In this case, the received packet is added (STEP 1363), and the new data in the received packet 1530 fills the gap and combines with the next block. The next block will already be the new cum_seq (i.e. it is not necessary to increment cum_seq).

FIG. 14D: In the fourth scenario 1404 (observed scenario 2B_2), the current state of the data structure 1500 shows the previously received packets as having TCP sequence numbers x and x+3. The most recently received packet is x+1. In FIG. 13B, when this fourth scenario is met (STEP 1344), multiple gaps exist in the data sequence (STEP 1354), and when the received packet 1530 combines with the block, gaps remain. In this case, the received packet is added (STEP 1364) to fill one of the gaps, and since the new data does not combine with the block following it, we need to advance (i.e. increment) cum_seq.

Figure 14E:
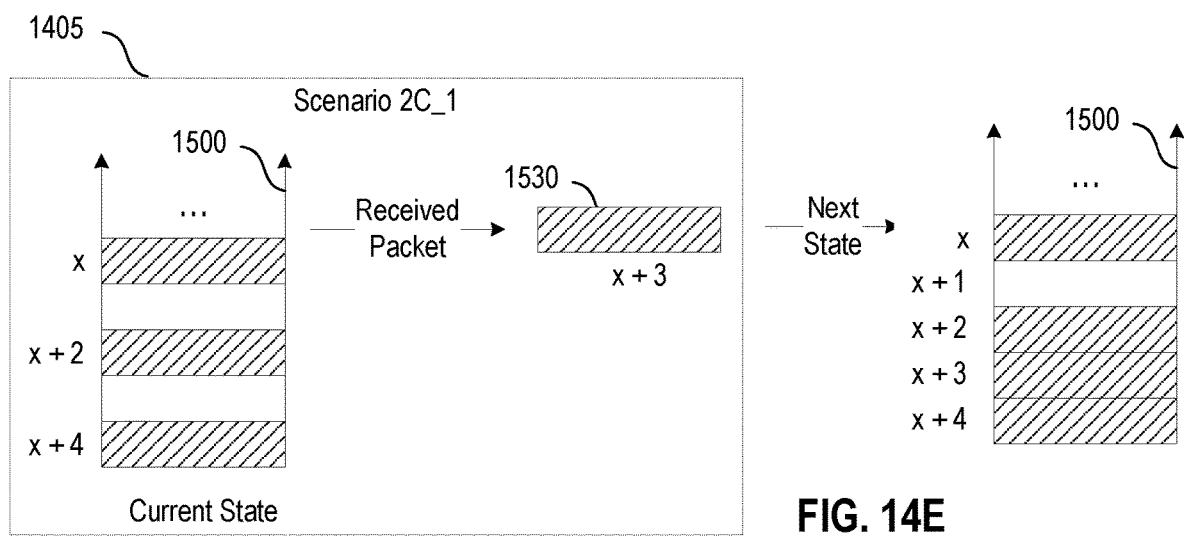
FIG. 14E illustrates a fifth scenario that may be encountered in the data structure.
Figure 14F:
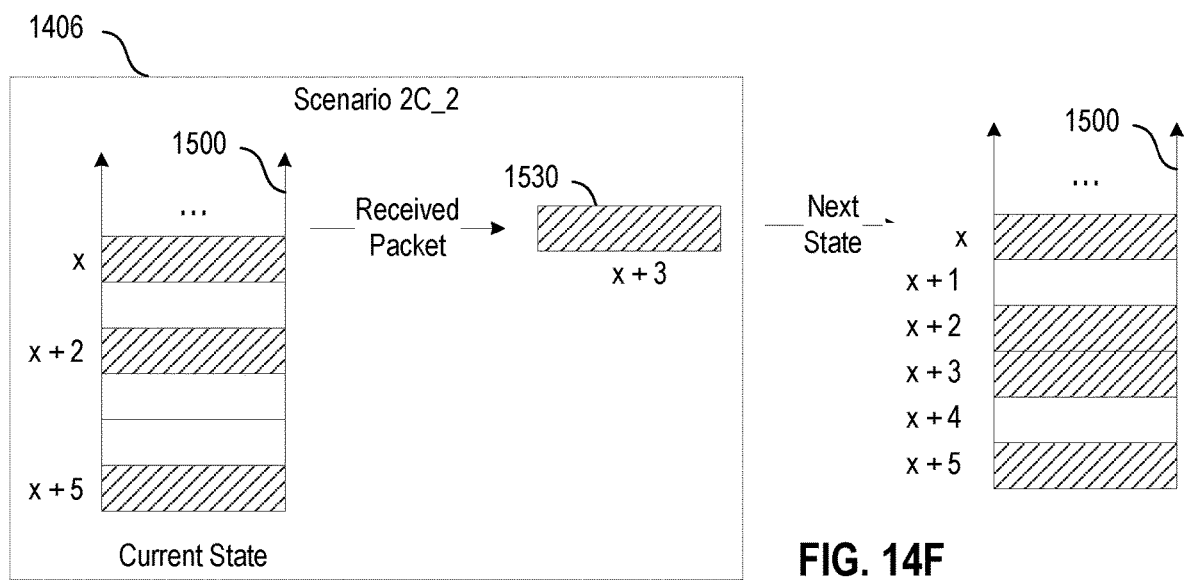
FIG. 14F illustrates a sixth scenario that may be encountered in the data structure.

In FIGS. 14E and 14F (observed scenarios 2C_1 and 2C_2), which are variations of each other, there are gaps in the data_seq that remain even after the received packet is added to the data_seq, in which case the received packet 1530 fills/appends one of the gaps. This packet is a likely a retransmission for loss between PSE and DS.

FIG. 14E: In the fifth scenario 1405 (observed scenario 2C_1), the current state of the data structure 1500 shows the previously received packets as having TCP sequence numbers x, x+2, and x+4. The most recently received packet is x+3. In FIG. 13B, when this fifth scenario is met (STEP 1345), two gaps exist in the data sequence (STEP 1355), and the received packet fills/appends a gap in the middle. This received packet is a retransmission for loss between PSE and DS. In this case, the received packet is added, and no increment to the sequence number is required.

FIG. 14F: In the sixth scenario 1406 (observed scenario 2C_2), the current state of the data structure 1500 shows the previously received packets as having TCP sequence numbers x, x+2, and x+5. The most recently received packet is x+3. In FIG. 13B, when this sixth scenario is met (STEP 1346), three (or more in some cases) gaps exist in the data sequence (STEP 1356), and the received packet fills/appends a gap in the middle. This received packet is a retransmission for loss between the PSE and DS. The received packet is added (STEP 1366) and no increment to the sequence number is required.

Figure 14G:
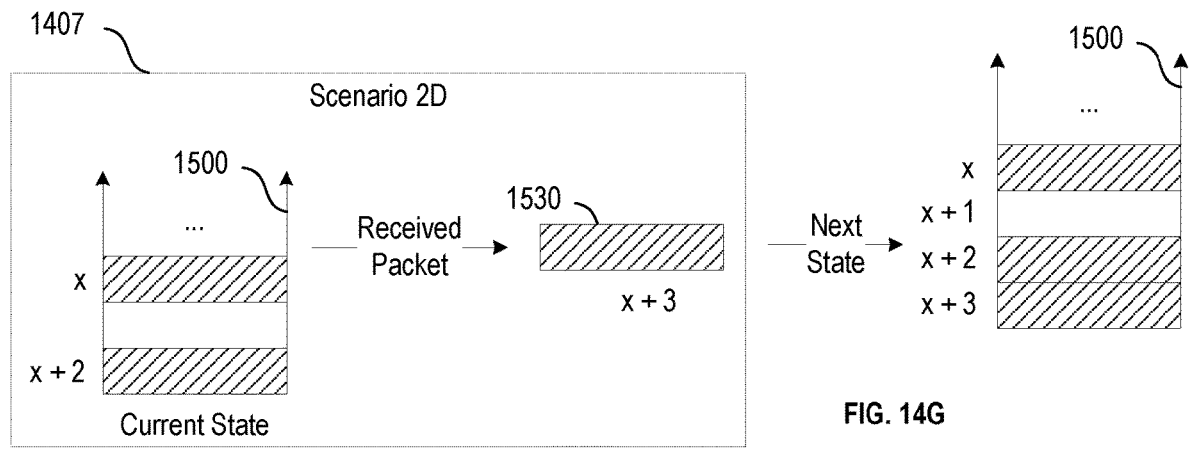
FIG. 14G illustrates a seventh scenario that may be encountered in the data structure.

FIG. 14G: In the seventh scenario 1407 (observed scenario 2D), the current state of the data structure 1500 shows the previously received packets as having TCP sequence numbers x and x+2. The most recently received packet is x+3. In FIG. 13B, when this seventh scenario is met (STEP 1347), a gap exists in the data sequence (STEP 1357), that remains when the received packet is appended to the end of the last block. The received packet is added (STEP 1367) and the sequence number is incremented.

Figure 14H:
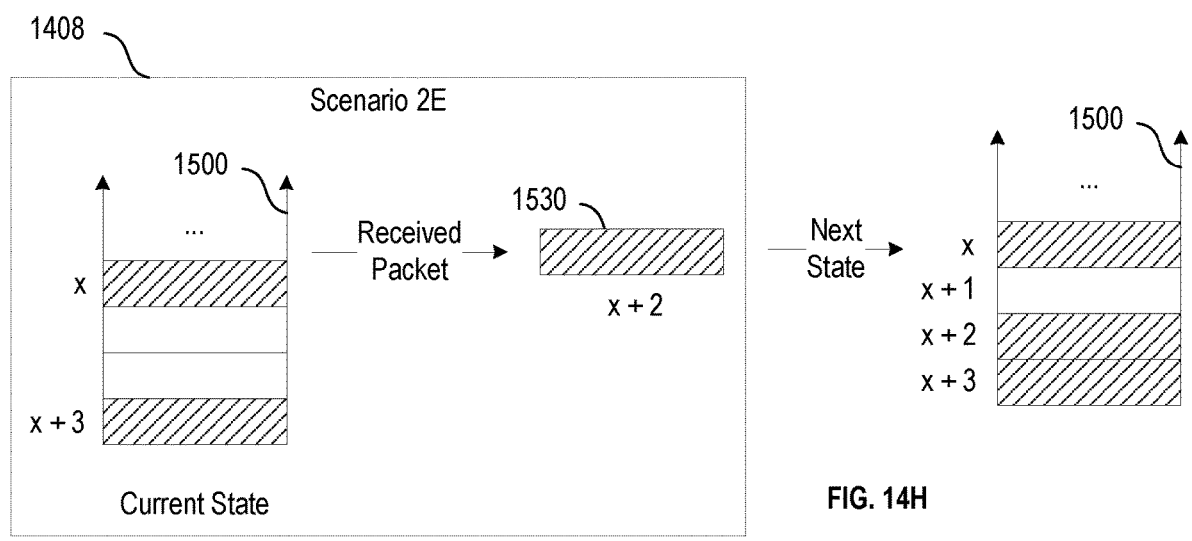
FIG. 14H illustrates an eighth scenario that may be encountered in the data structure.

FIG. 14H: In the eighth scenario 1408 (observed scenario 2E), the current state of the data structure 1500 shows the previously received packets as having TCP sequence numbers x and x+3. The most recently received packet 1530 is x+2. In FIG. 13B, when this eighth scenario is met (STEP 1348), two adjacent gaps exist before the last block (STEP 1358). The received packet is sequenced before the last block (this packet falls right before where is begins.) The received packet is added (STEP 1368), the sequence number is not incremented, and pse_snd_loss_count is incremented by 1.

If the determination is made (STEP 1348) that none of previous scenarios were satisfied, then the PSE has not seen this data yet and the received packet creates a new gap. i.e., a packet was lost between PSE and sender or the received packet arrived out of order (000). The received packet is saved to create a new state data_seq for this flow, and when the lost packet(s) are retransmitted, the received retransmitted packed are tracked and processed as above described for the first through eighth scenarios. Until then we just track the new sequence gap. Particularly, from STEP 1348, if none of the first through eighth scenarios were met, then operation moves to FIG. 13C (STEP 1378). FIG. 13C is a flow chart of continued operations, from FIG. 13B (STEP 1380). As noted (STEP 1382) to get to this point in operation, none of the above scenarios apply, and in this case (STEP 1384) the PSE has not seen this data yet, and the packet will create a new gap in the sequence. It is likely that a packet was lost between the PSE and the sender, or this packet arrived OOO, as noted (STEP 1386). Next, the newly created sequence gap is tracked, and the data sequence is incremented for the received packet.

The loss counts can be reset at beginning of each time interval. The Packet Loss Rate (PLR) for a time interval will be the loss count/# of data packets transmitted for that interval.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of measuring packet delay variation (PDV) at an intermediate node of a packet-based wireless communication network during a timestamp-enabled communication session in which a plurality of packets are communicated between a data sender (DS) and a data receiver (DR), the intermediate node connected between the DS and the DR, the plurality of session packets including a Timestamp value (TSval) and a Timestamp echo reply (TSecr) value, comprising the steps of:

receiving a first packet sent from the DS having a TSval=S_i, and measuring a timestamp of arrival (t1) of said packet at the intermediate node;

receiving a second packet sent from the DS from the same session and having the same TSval=S_i, and measuring a timestamp of arrival (t2) of said packet at the intermediate node;

calculating the inter-packet arrival time between t_1 and t_2 to provide a forward packet delay (PD) measurement;

receiving a first return packet sent from the DR having a TSval=R_i, and measuring a timestamp of arrival (t3) of said packet at the intermediate node;

receiving a second return packet sent from the DR from the same session and having the same TSval=R_i, and measuring a timestamp of arrival (t4) of said packet at the intermediate node;

calculating the inter-packet arrival time responsive to t_3 and t_4 to provide a return PD measurement;

for a plurality of packets in the session, repeating said steps to provide a plurality of forward PD measurements and a plurality of return PD measurements; and processing said forward and return PD values to provide an overall PD value.

2. The method of claim 1 wherein the packet-based communication session is a TCP/IP session.

3. The method of claim 1 wherein the DS comprises a UE and the DR comprises a server.

4. The method of claim 1 wherein the forward PD value is calculated as t_2−t_1, and the return PD value is calculated as t_4−t_3.

5. The method of claim 1 wherein the overall PD value measured over a time interval is the variance associated with the forward and return PD measurements during that time interval.

6. The method of claim 1 wherein the DS comprises a UE and the DR comprises a server.

7. The method of claim 1 wherein the DS comprises a server and the DR comprises a UE.

* * * * *